United States Patent
Wei

(10) Patent No.: US 9,723,455 B2
(45) Date of Patent: Aug. 1, 2017

(54) METHOD OF TRANSMITTING MULTICAST SIGNAL AND UNICAST SIGNAL SIMULTANEOUSLY AND RELATED COMMUNICATION DEVICE

(71) Applicant: ACER INCORPORATED, New Taipei (TW)

(72) Inventor: Hung-Yu Wei, New Taipei (TW)

(73) Assignee: ACER INCORPORATED, New Taipei (TW)

(*) Notice: Subject to any disclaimer, the term of this patent is extended or adjusted under 35 U.S.C. 154(b) by 357 days.

(21) Appl. No.: 13/902,994

(22) Filed: May 28, 2013

(65) Prior Publication Data

US 2014/0112234 A1 Apr. 24, 2014

Related U.S. Application Data

(60) Provisional application No. 61/716,616, filed on Oct. 22, 2012.

(51) Int. Cl.
*H04W 4/06* (2009.01)
*H04B 7/024* (2017.01)
*H04J 11/00* (2006.01)

(52) U.S. Cl.
CPC .............. *H04W 4/06* (2013.01); *H04B 7/024* (2013.01); *H04J 11/003* (2013.01)

(58) Field of Classification Search
CPC ....... H04W 4/06; H04W 36/30; H04W 72/00; H04W 72/12; H04W 24/10; H04W 24/00; H04H 20/71; H04J 3/26; H04M 1/00; H04L 12/26
USPC ....... 370/252, 312, 329, 332, 336, 432, 486; 455/437, 452.2, 562.1
See application file for complete search history.

(56) References Cited

U.S. PATENT DOCUMENTS

| | | | | |
|---|---|---|---|---|
| 2009/0279563 A1* | 11/2009 | Sampath | ............. | H04W 52/322 370/432 |
| 2011/0235562 A1* | 9/2011 | Tong | .................... | H04B 7/0874 370/312 |
| 2012/0039229 A1* | 2/2012 | Etemad | ................... | H04W 4/06 370/312 |

FOREIGN PATENT DOCUMENTS

| | | |
|---|---|---|
| CN | 101416461 A | 4/2009 |
| CN | 101978617 A | 2/2011 |
| CN | 102006557 A | 4/2011 |
| CN | 102017664 A | 4/2011 |
| EP | 2 262 289 A1 | 12/2010 |
| GB | 2482183 A | 1/2012 |
| WO | 2009137749 A1 | 11/2009 |
| WO | 2012010895 A1 | 1/2012 |

* cited by examiner

*Primary Examiner* — Charles C Jiang
*Assistant Examiner* — Wali Butt
(74) *Attorney, Agent, or Firm* — Winston Hsu

(57) ABSTRACT

A method of transmitting a multicast signal and a unicast signal simultaneously for a network of a wireless communication system comprises transmitting the multicast signal to at least one first communication device in the wireless communication system during a time interval via at least one first antenna of the network; transmitting the unicast signal to a communication device in the wireless communication system during the time interval via at least one second antenna of the network; and reducing interference caused by at least one of the multicast signal and the unicast signal, when transmitting the multicast signal and the unicast signal.

13 Claims, 7 Drawing Sheets

METHOD OF TRANSMITTING MULTICAST SIGNAL AND UNICAST SIGNAL SIMULTANEOUSLY AND RELATED COMMUNICATION DEVICE

CROSS REFERENCE TO RELATED APPLICATIONS

This application claims the benefit of U.S. Provisional Application No. 61/716,616, filed on Oct. 22, 2012 and entitled "Underlay Unicast Transmission under MBMS with Multi-Antenna Wireless Nodes", the contents of which are incorporated herein in their entirety.

BACKGROUND OF THE INVENTION

1. Field of the Invention

The present invention relates to a method used in a wireless communication system and related communication device, and more particularly, to a method of transmitting a multicast signal and a unicast signal simultaneously and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

On the other hand, multimedia broadcast multicast service (MBMS) service or evolved MBMS (E-MBMS) service have been introduced in the UMTS, the LTE system and the LTE-A system, for transmitting multicast/broadcast signals such as TV programs, films, music, etc. to user equipments. Comparing with a traditional unicast, the MBMS service (hereafter referred to both the MBMS service and/or the E-MBMS service) is downlink only, and is multicasted/broadcasted from a network of the abovementioned systems to multiple (e.g., a specific group of) UEs via a point-to-multipoint transmission. Characteristic of the MBMS service enables the network to provide the MBMS service to unlimited number of UEs with a constant network load. Besides, a UE in the UMTS, the LTE system and/or the LTE-A system can receive the MBMS service inherently, and no additional hardware component is needed to be installed for the MBMS service. Thus, the MBMS service is attractive considering both hardware cost and resource efficiency.

According to the above description, the network can provide the MBMS service to the UEs by using multiple antennas, to improve the reception of the multicast/broadcast signals. Besides, dedicated radio resource (i.e., MBMS resource) is allocated for transmitting the multicast/broadcast signals carrying the MBMS service, according to the MBMS service currently developed. However, distribution (i.e., locations) of the UEs varies constantly, and there are situations where the network only needs to transmit the multicast/broadcast signals by using part of the antennas. If the rest of the antennas are not exploited, transmission efficiency of the network is wasted. Thus, exploiting part of the antennas for improving the transmission efficiency of the network, to enhance the capacity of the wireless communication system is a topic to be discussed and addressed.

SUMMARY OF THE INVENTION

The present invention therefore provides a method and related communication device for transmitting a multicast signal and a unicast signal simultaneously to solve the abovementioned problem.

A method of transmitting a multicast signal and a unicast signal simultaneously for a network of a wireless communication system is disclosed. The method comprises transmitting the multicast signal to at least one first communication device in the wireless communication system during a time interval via at least one first antenna of the network; transmitting the unicast signal to a communication device in the wireless communication system during the time interval via at least one second antenna of the network; and reducing interference caused by at least one of the multicast signal and the unicast signal, when transmitting the multicast signal and the unicast signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
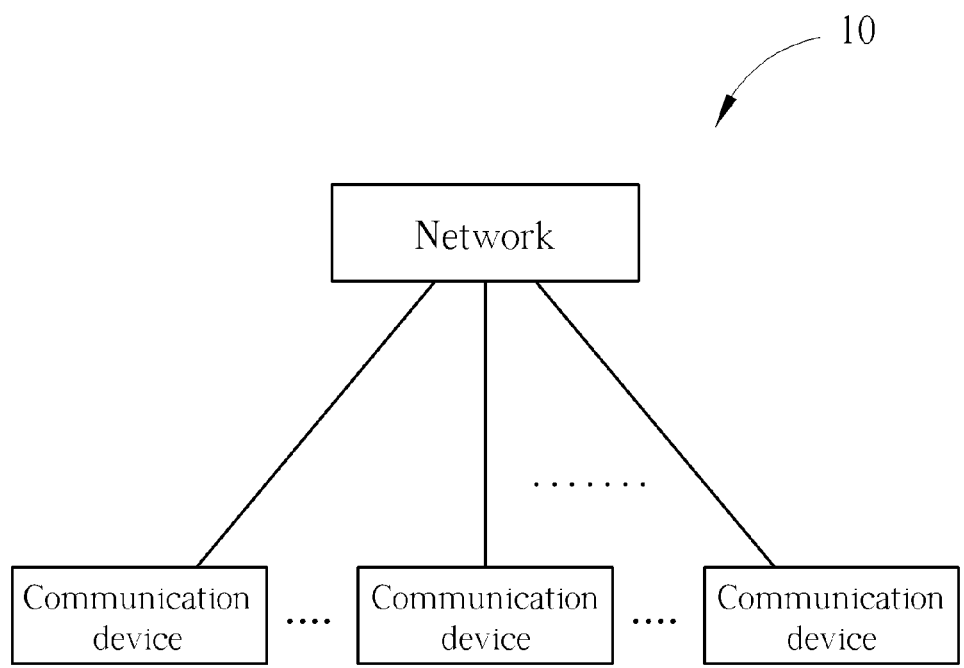
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a plurality of communication devices and a network. The wireless communication system 10 may be a wideband code division multiple access (WCDMA) system such as a universal mobile telecommunications system (UMTS). Alternatively, the wireless communication system 10 may be an orthogonal frequency division multiplexing (OFDM) system and/or an orthogonal frequency division multiple access (OFDMA) system, such as a long term evolution (LTE) system, a LTE-Advanced (LTE-A) system or a successor of the LTE-A system. The network can provide a multimedia broadcast multicast service (MBMS) service to the communication devices, wherein the MBMS service is referred to the MBMS service and/or the evolved MBMS (E-MBMS) service. Thus, the communication devices can watch, store and/or edit multimedia contents such as TV programs, films, music, etc., via receiving the MBMS service. Besides, the network equips with multiple antennas, i.e., multiple-input multiple-output (MIMO) is supported. Thus, the network can communicate with a communication device (e.g., for unicast or multicast) via one or more antennas.

Please note that, the communication devices and the network are simply utilized for illustrating a structure of the wireless communication system 10. Practically, the network can include NodeBs (NBs) in a universal terrestrial radio access network (UTRAN) of the UMTS. Alternatively, the network can include evolved NodeBs (eNBs), relay nodes and/or remote radio heads (RRHs) in an evolved UTRAN (E-UTRAN) of the LTE system or the LTE-A system, and are not limited herein. The communication devices can be mobile devices such as user equipments (UEs), mobile stations (MSs), mobile phones, laptops, tablet computers, electronic books, and portable computer systems. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Besides, the network can be seen as a multi-point cooperative network composed of multiple transmission points such as eNBs, relay nodes and/or RRHs. Note that an eNB or a relay node may control multiple transmission points in some scenarios. In detail, the communication device may transmit a signal (e.g., a packet) to a first set of the transmission points, and the communication device may receive signals transmitted by a second set of the transmission points, wherein the first set and the second set may be the same or different. As a result, signal quality of the signals is improved. For example, when the wireless communication system 10 is referred to the LTE-A system or its successor, it means that the wireless communication system 10 supports coordinated multi-point (CoMP) transmission/reception. The CoMP can be configured as Joint Processing (JP) (e.g., joint transmission (JT) or dynamic point selection (DPS)) or Coordinated Scheduling/Beamforming (CS/CB), and is not limited.

Figure 2:
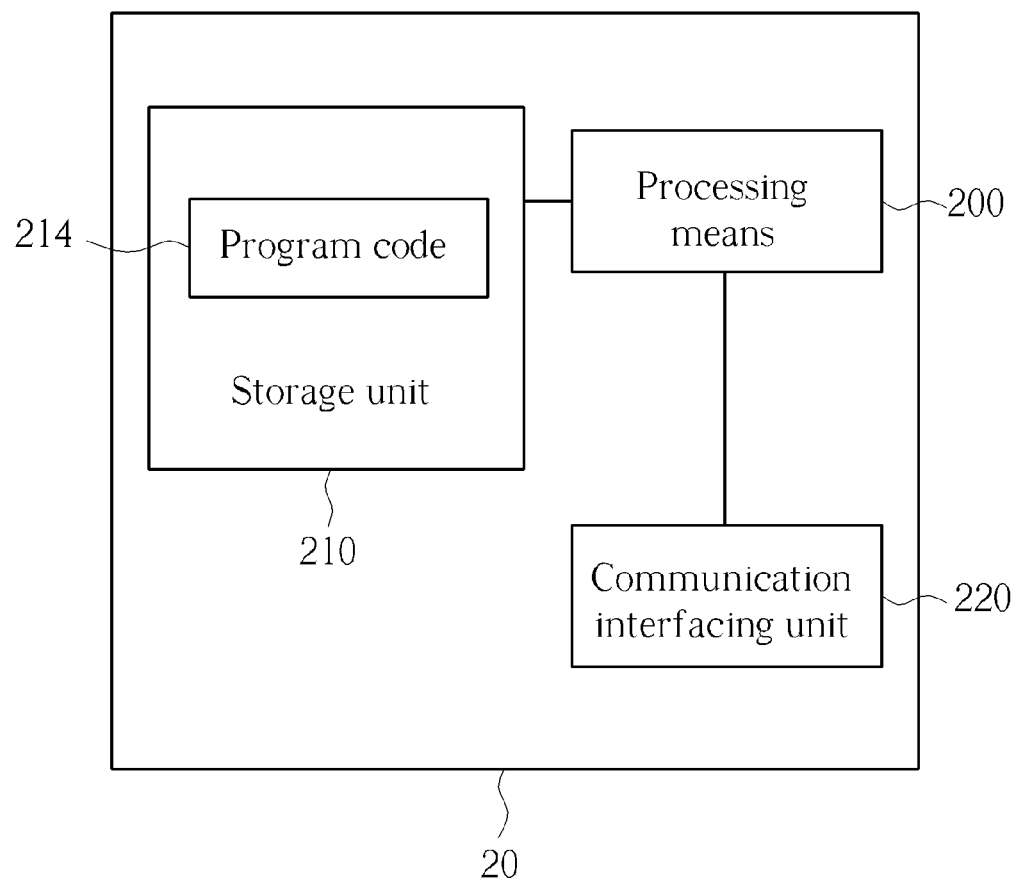
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), Compact Disc Read-Only Memory (CD-ROM)/Digital Versatile Disc Read-Only Memory (DVD-ROM), magnetic tape, hard disk, and optical data storage device. The communication interfacing unit 220 is preferably a radio transceiver, and can transmit and receive wireless signals according to processing results of the processing means 200.

Figure 3:
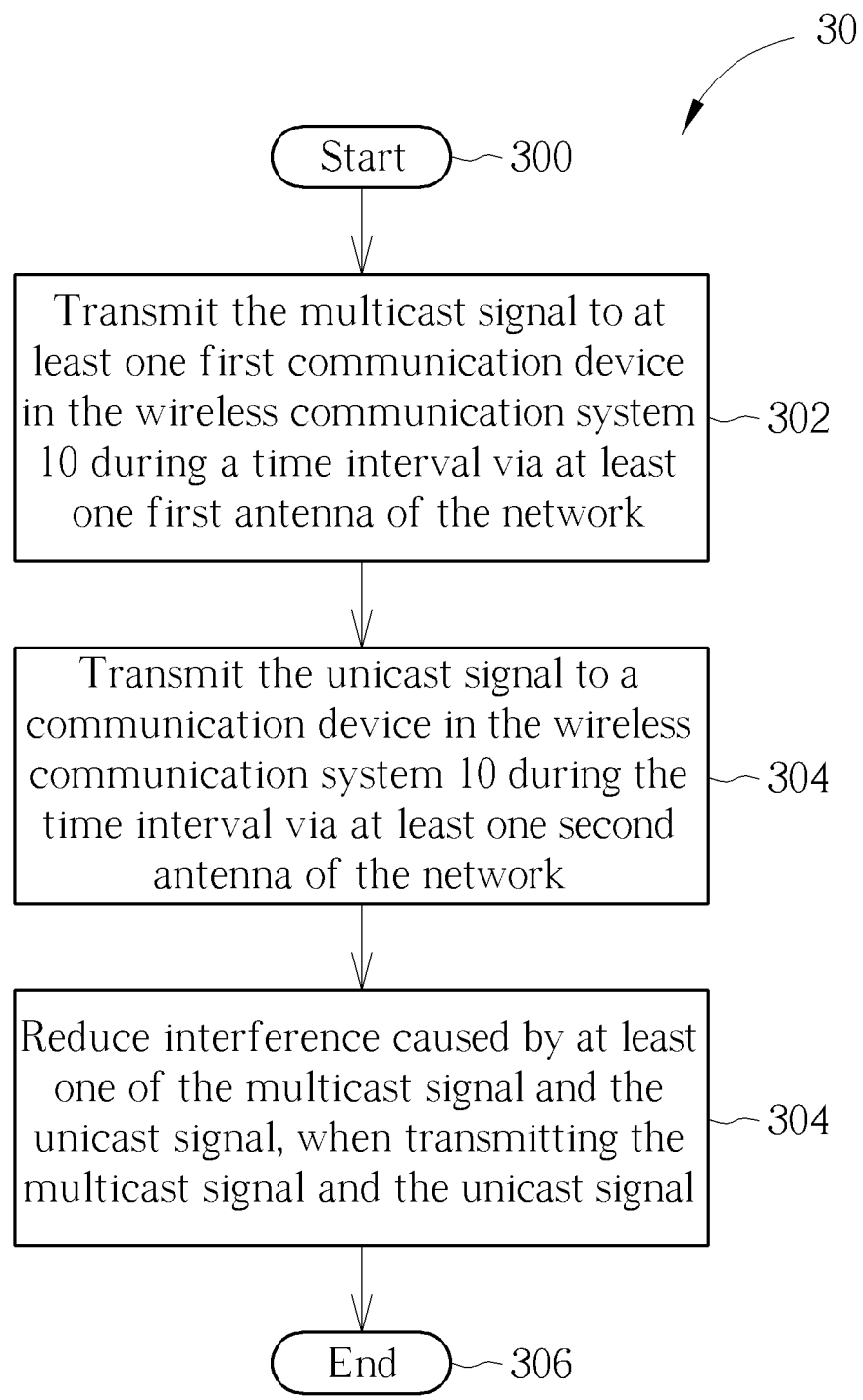
FIG. 3 is a flowchart of a process according to an example of the present invention.

Please refer to FIG. 3, which is a flowchart of a process 30 according to an example of the present invention. The process 30 is utilized in the network shown in FIG. 1, for transmitting a multicast signal (e.g., for providing the MBMS service) and a unicast signal simultaneously. The process 30 may be compiled into the program code 214 and includes the following steps:

Step 300: Start.

Step 302: Transmit the multicast signal to at least one first communication device in the wireless communication system 10 during a time interval via at least one first antenna of the network.

Step 304: Transmit the unicast signal to a communication device in the wireless communication system 10 during the time interval via at least one second antenna of the network.

Step 306: Reduce interference caused by at least one of the multicast signal and the unicast signal, when transmitting the multicast signal and the unicast signal.

Step 308: End.

According to the process 30, the network transmits the multicast signal to at least one first communication device in the wireless communication system 10 during a time interval via at least one first antenna of the network. Besides, the network transmits the unicast signal to a communication device in the wireless communication system 10 during the time interval via at least one second antenna of the network. Further, the network reduces (i.e., mitigates, minimizes) interference caused by at least one of the multicast signal and the unicast signal, when transmitting the multicast signal and the unicast signal. In other words, the network not only transmits the multicast signal and the unicast signal at the same time by using multiple antennas (e.g., with MIMO, interference nulling, interference alignment), but reduces the interference caused by the multicast signal and/or the unicast signal to unintended communication devices. Note that the transmission of the unicast signal in this scheme can be seen as an underlay unicast transmission. Besides, the interference to be reduced may include first interference caused by the multicast signal to the communication device, second interference caused by the unicast signal to the at least one first communication device, or both the first interference and the second interference. Thus, transmission efficiency of the network can be improved, i.e., transmission capability of the network is utilized efficiently. As a result, capacity of the wireless communication 10 can be enhanced.

Figure 4:
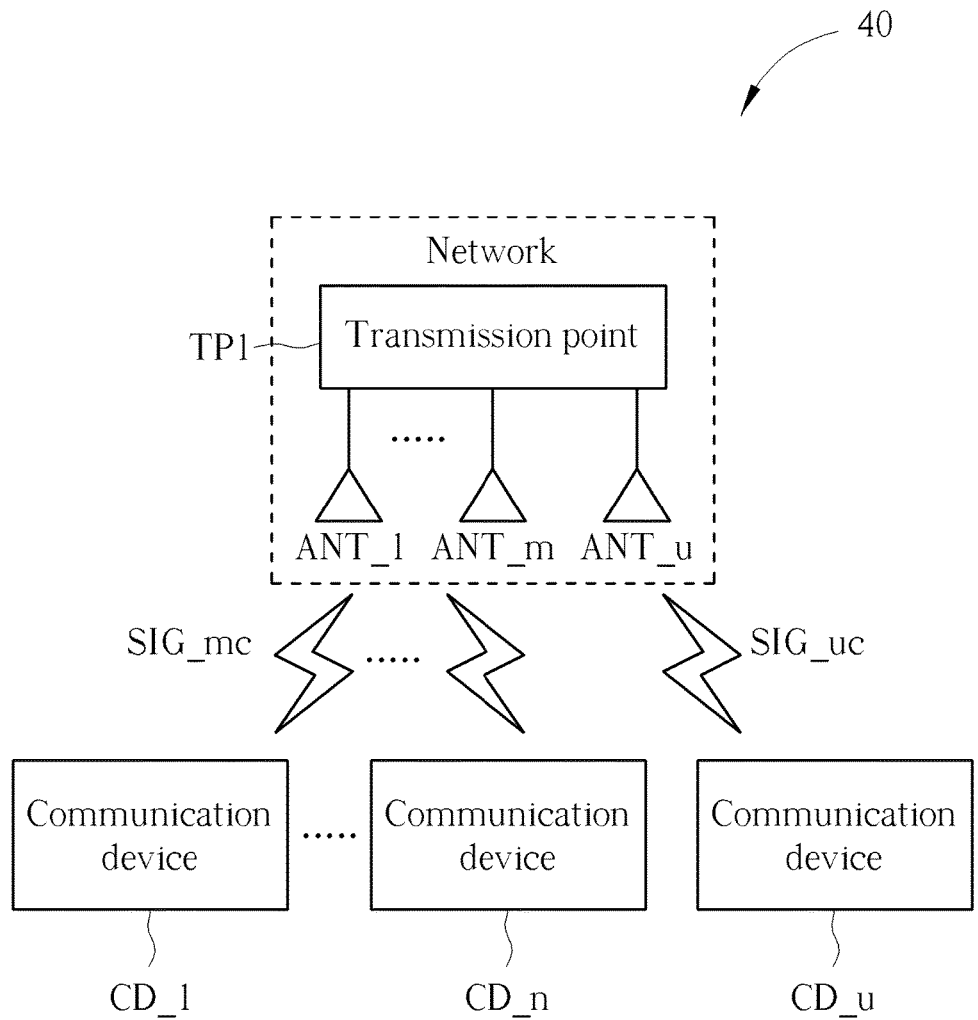
FIG. 4 is a schematic diagram of a wireless communication system according to an example of the present invention.

Please note that, realization of the process 30 is not limited. Please refer to FIG. 4, which is a schematic diagram of a wireless communication system 40 according to an example of the present invention. In FIG. 4, the network includes a transmission point TP1 communicating with communication devices CD_1-CD_n and CD_u. In detail, the transmission point TP1 controls (e.g., equips with) antennas ANT_1-ANT_m and ANT_u. The transmission point TP1 transmits a multicast signal SIG_mc to the communication devices CD_1-CD_n during a time interval via the antennas ANT_1-ANT_m. During the same time interval, the transmission points TP1 transmits a unicast signal SIG_uc to the communication device CD_u via the antenna ANT_u. Further, the transmission points TP1 reduces interference caused by at least one of the multicast signal SIG_mc and the unicast signal SIG_uc, when transmitting the multicast signal SIG_mc and the unicast signal SIG_uc. In other words, the transmission point TP1 does not need to transmit the multicast signal SIG_mc via all the controlled (e.g., equipped) antennas ANT_1-ANT_m and ANT_u, but can reserve the antenna ANT_u for transmitting the unicast signal SIG_uc. At the same time, the transmission point TP1 performs multiple antenna techniques such as MIMO (e.g., precoding, space-time coding, spatial multiplexing, etc.), interference nulling, interference alignment, etc., to reduce the interference. Thus, transmission efficiency of the network can be improved, and capacity of the wireless communication 10 can be enhanced.

Figure 5:
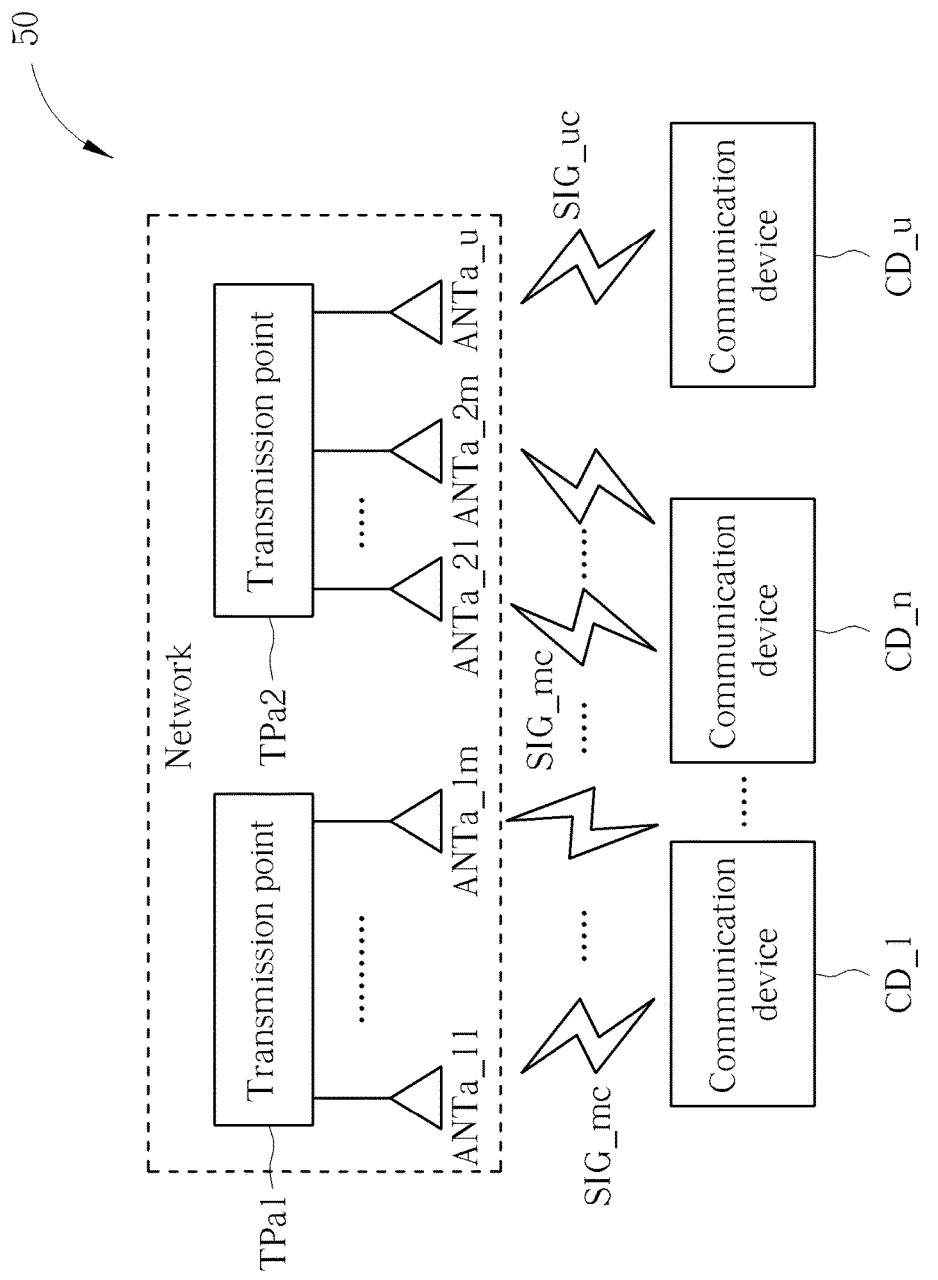
FIG. 5 is a schematic diagram of a wireless communication system according to an example of the present invention.

Please refer to FIG. 5, which is a schematic diagram of a wireless communication system 50 according to an example of the present invention. In FIG. 5, the network includes a transmission point TPa1 and a transmission point TPa2 communicating with communication devices CD_1-CD_n and CD_u. In detail, the transmission point TPa1 controls (e.g., equips with) antennas ANTa_11-ANTa_1m, and the transmission point TPa2 controls (e.g., equips with) antennas ANTa_21-ANTa_2m and ANTa_u. The transmission points TPa1 and TPa2 transmit a multicast signal SIG_mc to the communication devices CD_1-CD_n during a time interval via the antennas ANTa_11-ANTa_1m and the antennas ANTa_21-ANTa_2m. During the same time interval, the transmission points TPa2 transmits a unicast signal SIG_uc to the communication device CD_u via the antenna ANTa_u. Further, the transmission point TPa1 and/or the transmission point TPa2 reduce interference caused by at least one of the multicast signal SIG_mc and the unicast signal SIG_uc. For example, the transmission point TPa1 and/or the transmission point TPa2 can reduce first interference caused by the multicast signal SIG_mc to the communication device CD_u. In another example, the transmission point TPa1 and/or the transmission point TPa2 can reduce second interference caused by the unicast signal SIG_uc to the communication devices CD_1-CD_n. In another example, the transmission point TPa1 and/or the transmission point TPa2 can reduce both the first interference and the second interference. In other words, the transmission point TPa2 does not need to transmit the multicast signal SIG_mc via all the controlled (e.g., equipped) antennas ANTa_21-ANTa_2m and ANTa_u, but can reserve the antenna ANTa_u for transmitting the unicast signal SIG_uc. At the same time, the transmission point TPa1 and/or the transmission point TPa2 performs multiple antenna techniques such as MIMO (e.g., precoding, space-time coding, spatial multiplexing, etc.), interference nulling, interference alignment, etc., to reduce the interference (e.g., the first interference and/or the second interference). Thus, transmission efficiency of the network can be improved, and capacity of the wireless communication 10 can be enhanced.

Note that when reducing the interference, there can be only one transmission point trying to reduce the interference caused without cooperating with the other transmission point. Alternatively, the transmission point TPa1 and the transmission point TPa2 can cooperate to reduce the interference, or a central server (e.g., mobile switching center (MSC), radio network controller (RNC), eNB, etc.) of the network coordinates the transmission point TPa1 and the transmission point TPa2, to reduce the interference. Thus, performance of the interference reduction (i.e., mitigation) can be improved.

Figure 6:
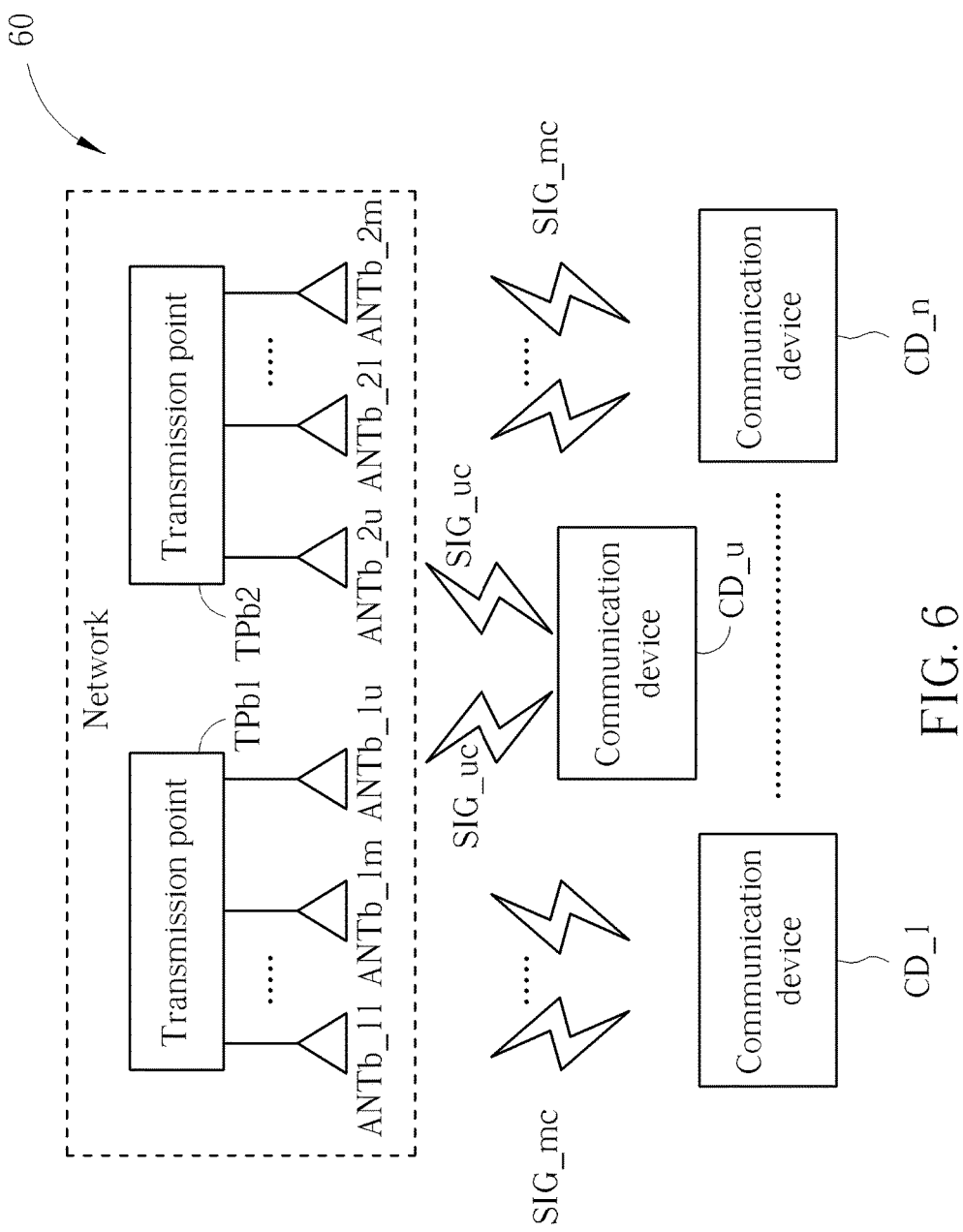
FIG. 6 is a schematic diagram of a wireless communication system according to an example of the present invention.

Please refer to FIG. 6, which is a schematic diagram of a wireless communication system 60 according to an example of the present invention. In FIG. 6, the network includes a transmission point TPb1 and a transmission point TPb2 communicating with communication devices CD_1-CD_n and CD_u. In detail, the transmission point TPb1 controls (e.g., equips with) antennas ANTb_11-ANTb_1m and ANTb_1u, and the transmission point TPb2 controls (e.g., equips with) antennas ANTb_21-ANTb_2m and ANTb_2u. The transmission points TPb1 and TPb2 transmit a multicast signal SIG_mc to the communication devices CD_1-CD_n during a time interval via the antennas ANTb_11-ANTb_1m and the antennas ANTb_21-ANTb_2m. During the same time interval, the transmission points TPb1 and the transmission points TPb2 transmit a unicast signal SIG_uc to the communication device CD_u via the antennas ANTb_1u and ANTb_2u, respectively. Further, the transmission point TPb1 and/or the transmission point TPb2 reduce interference caused by at least one of the multicast signal SIG_mc and the unicast signal SIG_uc. For example, the transmission point TPb1 and/or the transmission point TPb2 can reduce first interference caused by the multicast signal SIG_mc to the communication device CD_u. In another example, the transmission point TPb1 and/or the transmission point TPb2 can reduce second interference caused by the unicast signal SIG_uc to the communication devices CD_1-CD_n. In another example, the transmission point TPb1 and/or the transmission point TPb2 can reduce both the first interference and the second interference. In other words, the transmission points TPb1 and the transmission points TPb2 does not need to transmit the multicast signal SIG_mc via all the controlled (e.g., equipped) antennas ANTb_11-ANTb_1m, ANTb_21-ANTb_2m, ANTb_1u and ANTb_2u, but can reserve the antennas ANTb_1u and ANTb_2u for transmitting the unicast signal SIG_uc. At the same time, the transmission point TPb1 and/or the transmission point TPb2 performs multiple antenna techniques such as MIMO (e.g., precoding, space-time coding, spatial multiplexing, etc.), interference nulling, interference alignment, etc., to reduce the interference (e.g., the first interference and/or the second interference). Thus, transmission efficiency of the network can be improved, and capacity of the wireless communication 10 can be enhanced.

Please note that, the transmission point TPb1 and the transmission point TPb2 can cooperate to transmit the unicast signal SIG_uc, or a central server (e.g., MSC, RNC, eNB, etc.) of the network coordinates the transmission point TPb1 and the transmission point TPb2, to transmit the unicast signal SIG_uc. That is, coordinated multi-point (CoMP) transmission/reception schemes such as Joint Processing (JP) (e.g., joint transmission (JT) or dynamic point selection (DPS)) or Coordinated Scheduling/Beamforming (CS/CB) can be used for realizing the cooperation or the coordination. For example, the transmission point TPb1 and the transmission point TPb2 can transmit the unicast signal SIG_uc jointly or alternately according to the CoMP scheme. Thus, the reception of the unicast signal SIG_uc can be improved.

On the other hand, when reducing the interference, there can be only one transmission point trying to reduce the interference without cooperating with the other transmission point. Alternatively, the transmission point TPb1 and the transmission point TPb2 can cooperate to reduce the interference, or a central server (e.g., MSC, RNC, eNB, etc.) of the network coordinates the transmission point TPb1 and the transmission point TPb2, to reduce the interference. Thus, performance of the interference reduction (i.e., mitigation) can be improved.

Please note that, in the abovementioned examples, the interference to be reduced may be the first interference caused by the multicast signal SIG_mc to the communication device CD_u, the second interference caused by the unicast signal SIG_uc to the communication devices CD_1-CD_n, or both the first interference and the second interference. That is, a priority of reducing the first interference and a priority of reducing the second interference can be configured according to system requirements and/or design considerations. Preferably, the priority of reducing the first interference can be configured higher, since it is easier to reduce the interference for a single communication device. Note that information related to the interference reduction can be exchanged via a backhaul link established between the transmission points TPa1 and TPa2 (or TPb1 and TPb2), such that the transmission points TPa1 and TPa2 (or TPb1 and TPb2) can cooperate (or be coordinated by the central server) to reduce the interference.

As can be seen from the above, the network (e.g., a transmission point) can control multiple antennas. Thus, it is advantageous to transmit the multicast signal and/or the unicast signal by using a MIMO technique with a MIMO configuration, wherein the MIMO technique can be precoding, space-time coding and/or spatial multiplexing and the MIMO configuration can be a single-user-MIMO (SU-MIMO) configuration or a multi-user-MIMO (MU-MIMO) configuration. Besides, the MIMO technique can be applied to the multicast signal, the unicast signal (when the unicast signal is transmitted via multiple antennas) or both, to improve the reception of the signal. Note that periods for configuring the MIMO techniques and the MIMO configurations of the multicast signal and the unicast signal does not need to be the same. For example, the period for configuring the MIMO technique and the MIMO configuration of the multicast signal can be greater than the period for configuring the MIMO technique and the MIMO configuration of the unicast signal. On the other hand, the communication device CD_u can transmit a measurement feedback (e.g., obtained by using a reference signal) to the network. Thus, the network can perform the MIMO technique and even select a communication device for transmitting the unicast signal according to the measurement feedback, to obtain a better performance (i.e., less mismatch). For example, the measurement feedback can be a MIMO channel matrix, a precoding index or channel state information. Besides, the communication device CD_u can transmit the measurement feedback in a closed loop or an open loop according to system requirements and design considerations. In general, the close loop can achieve a better performance at the cost of a higher overhead caused by interaction between the network and the communication device. In comparison, the open loop can achieve a lower overhead at the cost of a worse performance due to feedback match.

Figure 7:
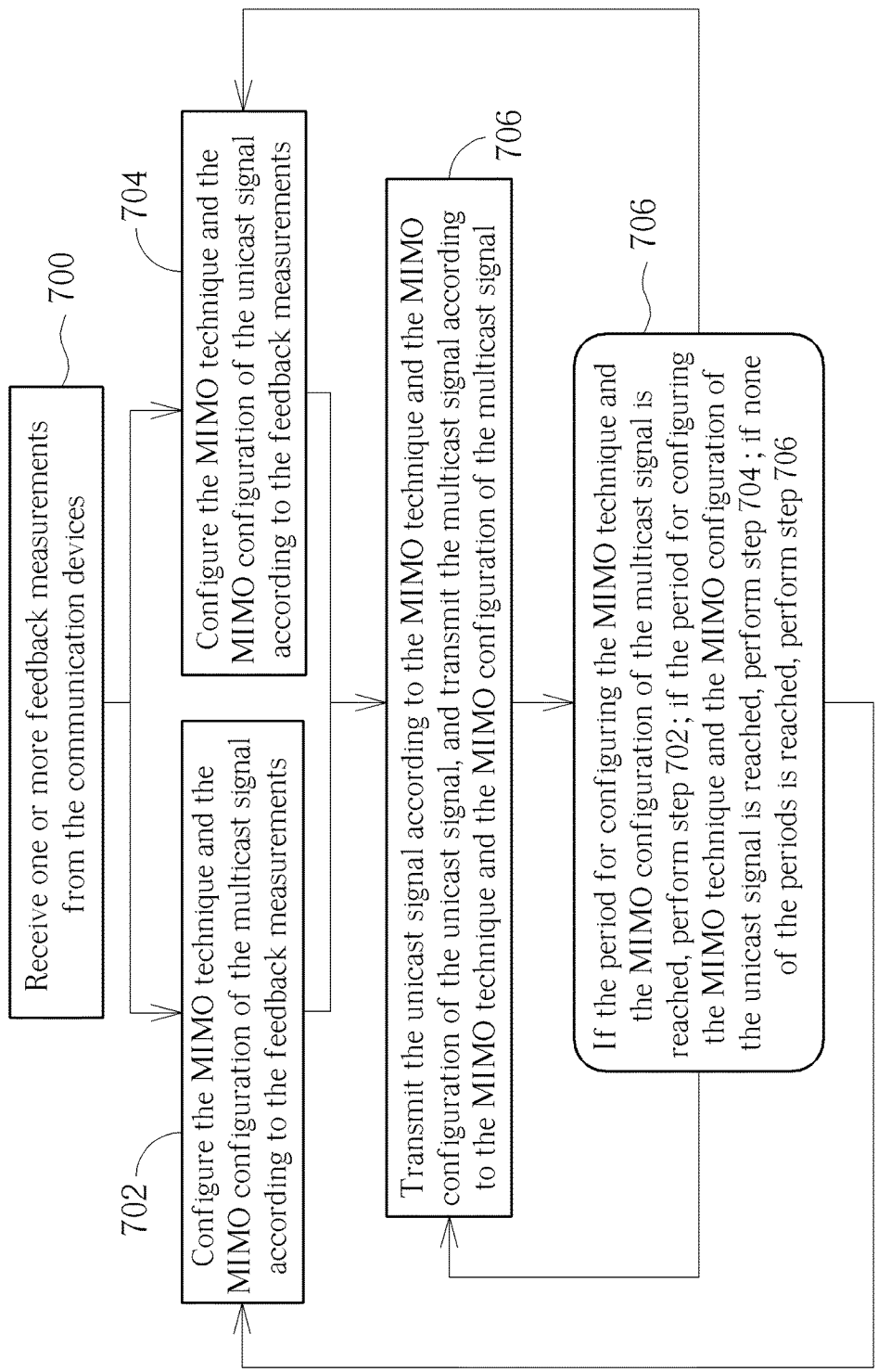
FIG. 7 is a flowchart of a process according to an example of the present invention.

The above description can be summarized into a process 70 shown in FIG. 7 which is utilized in the network, for transmitting a multicast signal (e.g., for providing the MBMS service) and a unicast signal simultaneously. The process 70 may be compiled into the program code 214 and includes the following steps:

Step 700: Receive one or more feedback measurements from the communication devices.

Step 702: Configure the MIMO technique and the MIMO configuration of the multicast signal according to the feedback measurements.

Step 704: Configure the MIMO technique and the MIMO configuration of the unicast signal according to the feedback measurements.

Step 706: Transmit the unicast signal according to the MIMO technique and the MIMO configuration of the unicast signal, and transmit the multicast signal according to the MIMO technique and the MIMO configuration of the multicast signal.

Step 708: If the period for configuring the MIMO technique and the MIMO configuration of the multicast signal is reached, perform step 702; if the period for configuring the MIMO technique and the MIMO configuration of the unicast signal is reached, perform step 704; if none of the periods is reached, perform step 706.

As shown in the process 70, after receiving one or more feedback measurements from the communication devices, the network configures the MIMO technique and the MIMO configuration according to the feedback measurements. Further, the period for configuring and transmitting the MIMO technique and the MIMO configuration of the multicast signal may be greater than the period for configuring and transmitting the MIMO technique and the MIMO configuration of the unicast signal. Accordingly, the network can configure the MIMO techniques and the MIMO configurations according to the corresponding periods. The network can keep transmitting the multicast signal and the unicast signal without configuring (e.g., updating) the MIMO techniques and the MIMO configurations, if none of the periods is reached. Operations and variations of the process 70 can be referred to the above and following illustrations, and are not narrated herein.

On the other hand, the network can transmit a control signal to the communication device CD_u to indicate a configuration for receiving the unicast signal SIG_uc, before transmitting the unicast signal SIG_uc. For example, the configuration may include parameters and/or resource needed for receiving the unicast signal SIG_uc. Alternatively, the configuration may simply indicate an existence of the unicast signal SIG_uc, and the communication device CD_u may need to find the parameters and/or the resource in another signaling to receive the unicast signal SIG_uc. Note that the control signal can be transmitted via a control channel such as a broadcasting channel (BCH) or a MBMS point-to-multipoint Control Channel (MCCH), and is not limited herein.

Please note that, in the abovementioned examples, a transmission point uses only one antenna for transmitting the unicast signal SIG_uc, e.g., the antenna ANT_u, the antenna ANTa_u, the antenna ANTb_1u or the antenna ANTb_2u. However, this is not a restriction, and the transmission point can use multiple antennas for transmitting the unicast signal SIG_uc, when the transmission point can use fewer antennas for transmitting the multicast signal SIG_mc. Thus, the MIMO technique with the MIMO configuration can be used for transmitting the unicast signal SIG_uc, to further improve the reception of the unicast signal SIG_uc. Besides, the multicast signal mentioned above is a broadcast signal, when the multicast signal is not intended for a specific group of communication devices, e.g., for all communication devices in the wireless communication system 10.

As mentioned previously, the multicast signal SIG_mc and the unicast signal SIG_uc are transmitted in the same time interval. However, the multicast signal SIG_mc and the unicast signal SIG_uc can be transmitted in the same time interval and the same frequency band, to further utilize the resource efficiently. That is, the unicast signal SIG_uc is transmitted by using resources (e.g., MBMS resources) for transmitting the multicast signal SIG_mc. In this situation, the interference caused to the other communication devices can be reduced (i.e., mitigated) according to the abovementioned examples.

Those skilled in the art should readily make combinations, modifications and/or alterations on the abovementioned examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for transmitting a multicast signal and a unicast signal at the same time by using multiple antennas, while reducing the interference caused by the multicast signal and/or the unicast signal to unintended communication devices. Thus, transmission efficiency of the network can be improved, and capacity of the wireless communication can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting a multicast signal and a unicast signal simultaneously for a network of a wireless communication system, the method comprising:
   transmitting the multicast signal to at least one first communication device in the wireless communication system during a time interval via at least one first antenna of the network;
   transmitting the unicast signal to a communication device in the wireless communication system during the time interval via at least one second antenna of the network; and
   reducing interference caused by at least one of the multicast signal and the unicast signal, when transmitting the multicast signal and the unicast signal;
   wherein the network transmits the multicast signal and the unicast signal by using a MIMO technique with a MIMO configuration;
   wherein the multicast signal and the unicast signal are transmitted in a same frequency band;
   wherein a priority of reducing the interference caused by the multicast signal to the communication device is higher than a priority of reducing the interference caused by the unicast signal to the at least one first communication device.

2. The method of claim 1, wherein the at least one first antenna and the at least one second antenna are controlled by a transmission point of the network.

3. The method of claim 1, wherein the at least one first antenna and the at least one second antenna are controlled by a first transmission point of the network and a second transmission point of the network, respectively.

4. The method of claim 3, wherein at least one of the first transmission point and the second transmission point reduces the interference caused by the multicast signal to the communication device.

5. The method of claim 3, wherein at least one of the first transmission point and the second transmission point reduces the interference caused by the unicast signal to the at least one first communication device.

6. The method of claim 3, wherein the first transmission point and the second transmission point cooperate to reduce the interference, or a central server of the network coordinates the first transmission point and the second transmission point, to reduce the interference.

7. The method of claim 3, wherein the first transmission point further controls at least one third antenna, to transmit the unicast signal to the communication device during the time interval via the at least one third antenna.

8. The method of claim 7, wherein the first transmission point and the second transmission point cooperate to transmit the unicast signal, or a central server of the network coordinates the first transmission point and the second transmission point, to transmit the unicast signal.

9. The method of claim 3, wherein the second transmission point further controls at least one fourth antenna, to transmit the multicast signal to at least one second communication device of the wireless communication system during the time interval via the at least one fourth antenna.

10. The method of claim 1, wherein the network transmits the unicast signal according to a measurement feedback transmitted by the communication device.

11. The method of claim 1, wherein the network transmits a control signal to the communication device to indicate a configuration for receiving the unicast signal, before transmitting the unicast signal.

12. The method of claim 1, wherein the multicast signal is a broadcast signal.

13. The method of claim 1, wherein the network transmits the multicast signal, for providing a Multimedia Broadcast Multicast Services (MBMS) service to the at least one first communication device.

* * * * *